Patented Sept. 13, 1938

2,129,752

UNITED STATES PATENT OFFICE 2,129,752

SETTLING AID IN HEAVY SOLVENTS

James M. Whiteley, Roselle, N. J., assignor to Standard Oil Development Company, a corporation of Delaware No Drawing. Application June 15, 1934,
Serial No. 730,730

3 Claims. (Cl. 196—18)

The present invention deals with improved methods for separating waxy constituents from oils in order to produce oils of low cold test. The invention will be fully understood from the following description.

Waxy materials are separated from petroleum oils by various methods, all of which have in common the feature of solidifying the solid wax by chilling to low temperatures. The separation may be effected by mechanical means such as simple gravity separation, centrifugal sedimentation or filtration, either in ordinary plate or frame presses or in centrifugal filters.

The present invention deals with the process of separating waxes from oils, when diluted with solvents of the type which are heavier than the solid waxes themselves, by any of the means disclosed above, while under the influence of wax modifying agents or separation aids of the type which are freely dispersible in the oil. This case is a continuation in part of the invention disclosed in my co-pending U. S. application Serial No. 593,407, filed February 16, 1932.

Among the solvents included in the above class are the halogenated aliphatic or aromatic hydrocarbons such as carbon tetrachloride, dichlorethane, difluorpropane, tribromethane, dichlorethylene, trichlorpropylene, chlorbenzol or toluol and the like. While these solvents may be used alone it is preferred to use them in combinations either with each other or some other materials such as benzol, toluol, xylol and petroleum naphthas, ranging from propane to octane and heavier. The solvent is preferably selected so as to have a freezing point considerably below the temperature at which the wax separation is effective, also to have as low a solvent power for waxes at the separation temperature as possible, which makes for the least possible spread between wax separation temperature and the pour point of the oil produced. Particularly useful combinations of these types of solvents are as follows:

| | Per cent |
|---|---|
| Dichlor ethane | 75 |
| Carbon tetrachloride | 25 |
| Dichlor propane | 70 |
| Carbon tetrachloride | 30 |
| Dichlor ethane | 50 |
| Dichlorethylene | 50 |
| Dichlor ethane | 60 |
| Trifluor ethylene | 40 |
| Dichlor ethane | 70 |
| Carbon tetrachloride | 20 |
| Trichlorethylene | 10 |
| Dichlor ethane | 70 |
| Benzol | 30 |
| Dichlor propane | 75 |
| Toluol | 15 |
| Xylol | 10 |
| Ethylene difluoride | 70 |
| Carbon tetrachloride | 15 |
| Naphtha | 15 |

It should also be preferred to select such a combination of solvents, as those above, which do not tend to separate the oil into mutually insoluble layers at or near the temperature of wax separation, and in which the separation aid is barely soluble. The composition of the solvent can be readily varied so as to bring about this condition and to produce a slight turbidity. When the solvent dissolves the aid completely forming a clear solution, the separation aid is almost always of low activity.

The wax modifiers or separation aids which are used may also be produced by a great many different methods. In the first place, I may use small amounts of asphaltic materials produced particularly for the process, by high temperature oxidation of petroleum products or obtained from heavy petroleum residues by precipitation with the known class of solvents, which are miscible with oils but precipitate the asphalts. Of these may be mentioned briefly the light hydrocarbons, particularly those which are gaseous at normal temperatures, and alcohols and ketones although a great many others are known. These asphaltic materials may also be obtained as residues in the distillation of asphaltic base oils, and at the same time highly cracked tarry residues may also be employed. These may be added to clean stocks but asphaltic residues furnish their own modifiers. The materials which have been mentioned above are not the best materials which have been found because they are generally too soluble but they may be used in the present process in combination with the heavy solvent where the composition is adjusted carefully to prevent complete solubility. This process yields an oil of low pour point which is not raised substantially by subsequent acid, clay or other types of refining.

A second class of the wax modifying agents consists of those derived from paraffin wax, and these may be produced by chlorination of the wax to 10 or 15%, followed by condensation of the chlorinated paraffin alone or in the presence of aromatic hydrocarbons such as benzol or naphthalene through the influence of polymerizing catalysts of the type of aluminum chloride. If desired, the original chlorinated wax may be dechlorinated by raising the temperature so as to split off hydrochloric acid and leave a mixture of mono- and di- or even tri-olefines of the wax, which preserves substantially the original carbon structure found in the wax. This material may be condensed by itself, as indicated above, or may be condensed with naphthalene and similar aromatics. The condensation is not a simple alkylation but appears to be a combination of polymerization and alkylation. These materials are very effective although they form clear solutions in the solvent mixtures.

Condensation products may be produced directly from wax by the effect of high voltage, high frequency, electric discharges. This action is well known at the present time and results in a polymer which may be raised to almost any desired degree of polymerization. The heavier types of polymers are very effective for the present purposes and like the ones above form clear solutions.

Another class of these modifying agents is obtained from highly cracked oils such as Burton still or tube and tank tar. It is preferable to use heavy high boiling distillates from these materials and to treat them with condensing catalysts of the type of aluminum chloride under specific conditions. After the treatment these materials are separated from the sludge and may be recovered either as heavy liquid or as solid material. These substances are specifically described in a co-pending application, Serial Nos. 645,232 and 645,233, filed December 1, 1932.

Polymers which are suitable for the present purpose may be obtained from the distillation residues of high boiling, oxygen containing, organic materials which do not distill without leaving pitchy residues. In particular organic materials characterized by long hydrocarbon chains, with more than 10 or preferably more than 15 carbon atoms, from the class of alcohols, ketones, esters, aldehydes, acids and the like. The glycerides, heavy fatty acids, both saturated and unsaturated or hydroxylated, are especially desirable for the purpose as are also the residue on distillation of oxidation products of paraffin wax. These various materials are distilled and the residues left behind are the polymers which are used for the present purpose. Stearine pitch, cotton seed oil pitch and various fatty acid pitches and similar materials are excellent examples of this particular class of substances.

A still further class of substances having this property comprises the polyvalent metal soaps such as aluminum stearate, lead, nickel, zinc and magnesium stearate, and other soaps of natural acids as well as the corresponding soaps produced from acids derived by the oxidation of waxy hydrocarbons.

These are other materials which have this property to some degree including degras and lanolin, esters of the alkylol amines such as triethanol amine, and similar materials.

Any of the above mentioned modifying agents may be used and may be added to the oil before or after addition of the solvent. The mixture is preferably stirred carefully to obtain homogeneity and heating may be employed so as to make the mixing complete.

The amount of modifying agent required varies considerably with the particular type of agent employed, and with the concentration of the active material in the particular agent. Ordinarily, it is sufficient to use from .01 to 5.0% but as indicated before, such figures vary according to the care and method of producing the particular modifying agent. In any case, the material is added in a relatively minute amount and ordinarily shows no substantial effect on the oil after treatment.

The diluted oil is then chilled to the wax separation temperature and this may be done slowly according to ordinary procedure or it may be done rapidly, the modifying agents, having the property of allowing the chilling to be effected at very rapid rates which might be termed "shock chilling". Among the methods which can be used may be mentioned the evaporation of a part of the solvent effected by pulling a relatively high vacuum on the vessel in which the solvent diluted oil is maintained. In this manner the temperature of the oil may be reduced at rates of 25 to 50° F. per hour, or even greater. It should be understood that this is not the only method that can be used but any other means of reducing the temperature, for example, by external cooling, using brine, ammonia or the like are perfectly satisfactory.

The separation itself as indicated before may be effected by filtration in the ordinary plate and frame presses or continuous rotary filters now used for the filtration of waxy oils. The use of filtration aid effects a rapid flow and clear filtration. The waxy cake is considerably drier than ordinarily produced and the yield of oil is larger by several per cent than when the separation aid is not used.

The separation may be accomplished in rotary or centrifugal filters of the type disclosed in the copending application 669,084 filed May 3, 1933, in the names of Murphree and Reeves, with the same advantages as noted above.

The separation may also be effected by cold settling, which is merely gravity separation, or by centrifugal means, in which the effect of gravity is greatly increased. The separation may be effected in a series of steps, for example with intermediate cooling to successively lower temperatures and the mode of separation in these stages may all be similar or they may be different. There may be combinations of filtration steps with settling or centrifugation. One particularly desirable combination of steps consists in chilling and settling in the presence of a separation aid so as to obtain a large proportion of the oil which can be drawn off below the waxy layer. The oily-solvent layer may be filtered or otherwise treated, where desired, but ordinarily it is of sufficiently low pour point so as to be used directly. The waxy layer, which, of course, contains considerable amounts of oil and solvent may be filtered, say by means of a continuous rotary filter, or centrifuged. This method gives high yields with the minimum cost of equipment. The filter or centrifuge, which can be used if desired, is considerably smaller than necessary if the entire quantity of waxy oil is passed through it.

The oils treated by the present methods are of any type whatsoever. As indicated before, the heavy solvents, particularly chlorinated or other halogenated solvents, are capable of handling dirty stocks which can not be successfully centrifuged by methods now known in the art. It has been the previous practice to centrifuge stocks of the petrolatum class in which the crystal structure of the wax is not well defined and to filter shocks which show good crystal structure. However, by means of the present invention it is possible on the one hand to centrifuge even the most crystalline types of stocks and on the other hand, to filter stocks which show little clearly defined crystal structure.

In the above description it will be clearly noted that the separation aids mentioned are entirely different from a class of substances to which the same name has been applied in the arts, namely, the oil insoluble bulky earthy materials which were sometimes added to waxy oils in order to produce free flowing filter cakes. The present separation aids or wax modifies are freely soluble in the oils at elevated temperatures, and their action appears to be of an entirely different type from the earths which are insoluble in oils at any temperatures.

In order to illustrate the operation of my invention, the following examples are presented. In each of these experiments the separation is effected by cold settling advisedly because the effect may be more clearly estimated in numerical quantities. However, it will be fully understood that equal improvements are wrought where the separation is accomplished by centrifugal sedimentation or by filtration.

1. In the following comparative tests the oil used was an overhead stock having a 75 second Saybolt viscosity at 210° F. This oil was mixed with a solvent comprising 25% of $CCl_4$ and 75% of dichlorethane. The separation aid added in this test was one produced by the condensation of paraffin wax chlorinated to about 12% by weight of chlorin with about 10% of naphthalene. The condensation was effected at a temperature of about 100° F. with aluminum chloride. The amount of the separation aid varied as shown in the following table. The experiments consisted in placing 200 c. c. of the oil solvent mixture, which had been chilled to a wax separation temperature of −20° F. and which were thoroughly mixed in graduated cylinders. The blank sample containing no separation aid and the samples containing the various amounts of the condensation product were observed at intervals and the figures in the table indicate the amount of clear liquid which was separated. It will be understood that the wax was lighter in specific gravity than the oil solvent mixture so that the wax gathered at the top of the tube in each case.

*Amount of the wax modifier*

| Hours | Blank 0% | 0.02% 0.04% | 0.08% | 0.16% |
|---|---|---|---|---|
|  | c. c. | c. c. | c. c. | c. c. |
| 0 |  |  | 10 | 33 | 46 |
| 2 |  |  | 26 | 56 |  |
| 4 |  |  | 40 |  | 83 |
| 6 |  |  | 48 | 72 |  |
| 8 |  |  |  |  | 96 |
| 9 |  |  |  | 76 | 98 |
| 11.5 |  | 50 | 57 |  |  |

2. The test outlined in Example 1 is repeated with residual stock having an 81 second Saybolt viscosity at 210° F. The conditions of the experiment were substantially the same and the results are shown in the table below.

*Amount of the wax modifier*

| Hours | 0% | 0.04% | 0.08% | 0.16% |
|---|---|---|---|---|
|  | c. c. | c. c. | c. c. | c. c. |
| 0 |  |  | 19 |  |
| 3 |  |  | 69 | 64 |
| 4 |  | 45 |  |  |
| 6 |  | 42 | 91 | 85 |
| 7 |  | 65 |  |  |
| 11.5 |  | 64 | 78 | 104 | 93 |

3. In an experiment similar to that quoted above the settling rate of a blank sample and one containing a dewaxing aid were compared. The oil in both cases was a distillate having a viscosity of 170 seconds Saybolt at 210° F. The solvent was 75% dichlor ethane and 25% carbon tetrachloride and is used in proportion of 3 volumes of the mixed solvent to 1 of oil. Separation temperature is 22° F. The aid used in the experiment was an asphaltic polymer produced by the action of aluminum chloride in a heavy distillate from a cracking coil tar.

| Sample | Percent of aid used | Volume of clean oil separated out in— | |
|---|---|---|---|
|  |  | 4 hours | 72 hours |
|  |  | Percent | Percent |
| Blank | 0 | 0 | 35 |
| Blank+aid | .1 | 20 | 45 |
| Do | .5 | 50 | 62 |
| Do | 1.0 | 55 | 74 |

It will be seen that the degree of separation is much more rapid and complete when the separation aid is used.

4. The following experiment was carried out to illustrate the settling power of voltolized wax. The oil is the same as used above and the solvent is the same.

| Sample | Percent of separating aid | Volume of clean oil separated in 16 hours |
|---|---|---|
|  | Percent | Percent |
| Blank | 0 | 50 |
| Blank and voltolized paraffin wax M. P. 150° F | 1 | 78 |
| Blank and voltolized paraffin wax M. P. 122° F | 1 | 74 |

5. In a centrifuge test the presence of 1% of a separating oil made by low temperature aluminum chloride condensation of paraffin (diluted to 12%) with naphthalene, increased the centrifuge capacity by 25%.

The present invention is not to be limited by any theory of the operation, either of the solvent or the modifying agent, nor to any particular solvent or agent, nor to any particular type of stock, but only to the following claims in which it is desired to claim all novelty inherent in this invention.

I claim:

1. Process for separating waxy constituents from hydrocarbon oils which comprises diluting the oil with a solvent comprising a halogenated hydrocarbon heavier than wax in an amount at least sufficient to make the specific gravity of the mixture greater than that of wax, adding a wax modifying agent produced by condensation of active derivatives of paraffin wax which are prepared by chlorinating paraffin wax and then dechlorinating the same by heating to split off hydrochloric acid, leaving the carbon structure substantially unchanged, chilling the oil-solvent mixture to cause the wax to solidify and separating the solidified wax.

2. Process according to claim 1 in which the wax modifying agent is a polymer of the class produced from chlorinated wax and aromatic hydrocarbons.

3. Process according to claim 1, in which the wax modifying agent is produced as a condensation product of active derivatives of paraffin wax selected from the class of chlorinated waxes and the olefines derived by dechlorination.

JAMES M. WHITELEY.